United States Patent
Huang et al.

(10) Patent No.: US 6,472,775 B1
(45) Date of Patent: Oct. 29, 2002

(54) METHOD AND SYSTEM FOR ELIMINATING CERTAIN HARMONICS IN A DISTRIBUTED POWER SYSTEM

(75) Inventors: Fengtai Huang, Windsor (CA); Bing Cheng, W. Bloomfield, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 09/683,203

(22) Filed: Nov. 30, 2001

(51) Int. Cl.[7] .................................................. H02J 1/02
(52) U.S. Cl. ...................................................... 307/105
(58) Field of Search ........................... 363/132, 98, 40, 363/74; 323/207; 307/105

(56) References Cited

U.S. PATENT DOCUMENTS

| | | | |
|---|---|---|---|
| 4,757,434 A | 7/1988 | Kawabata et al. ............. | 363/41 |
| 4,835,411 A | 5/1989 | Takeda ....................... | 307/105 |
| 5,107,438 A | 4/1992 | Sato ........................... | 364/483 |
| 5,301,098 A | 4/1994 | Dhyanchand et al. ......... | 363/97 |
| 5,317,498 A | 5/1994 | Dhyanchand et al. ......... | 363/43 |
| 5,321,598 A * | 6/1994 | Moran ......................... | 323/207 |
| 5,329,217 A | 7/1994 | Kerkman et al. ............ | 318/811 |
| 5,345,375 A | 9/1994 | Mohan ........................ | 363/40 |
| 5,350,025 A | 9/1994 | Campbell et al. ........... | 173/111 |
| 5,351,178 A | 9/1994 | Brennen et al. .............. | 363/40 |
| 5,351,180 A * | 9/1994 | Brennen et al. ............. | 307/105 |
| 5,351,181 A | 9/1994 | Brennen et al. .............. | 363/71 |
| 5,355,025 A | 10/1994 | Moran et al. ................ | 307/105 |
| 5,377,092 A | 12/1994 | Rowand, Jr. et al. ......... | 363/41 |
| 5,384,696 A | 1/1995 | Moran et al. ................ | 363/40 |
| 5,465,203 A | 11/1995 | Bhattacharya et al. ........ | 363/40 |
| 5,513,090 A | 4/1996 | Bhattacharya et al. ........ | 363/40 |
| 5,548,165 A | 8/1996 | Mohan et al. ................ | 307/36 |
| 5,567,994 A | 10/1996 | Davis et al. ................. | 307/105 |
| 5,648,894 A | 7/1997 | DeDoncker et al. .......... | 363/39 |
| 5,731,965 A | 3/1998 | Cheng et al. ................. | 363/41 |
| 5,883,796 A | 3/1999 | Cheng et al. ................. | 363/40 |

* cited by examiner

*Primary Examiner*—Shawn Riley
(74) *Attorney, Agent, or Firm*—Seed IP Law Group PLLC

(57) ABSTRACT

In one embodiment, a harmonic feedback system is characterized by: a three-phase to two-phase transformer configured to convert an output fundamental frequency current from a distributed power system and to convert the output fundamental frequency current from a three-phase current to a two-phase stationary reference current; a harmonic frequency transformer configured to convert the two-phase stationary reference current to a synchronous reference current, said harmonic frequency transformer having a target synchronous reference frame frequency based upon a reference harmonic current of the output fundamental frequency current; at least one filter device configured to remove predetermined components from the synchronous reference current to output a harmonic feedback current; a summation component to compare the harmonic feedback current with the reference harmonic current and to output a harmonic error current for driving the distributed power system to produce the output current.

20 Claims, 4 Drawing Sheets

METHOD AND SYSTEM FOR ELIMINATING CERTAIN HARMONICS IN A DISTRIBUTED POWER SYSTEM

BACKGROUND OF INVENTION

1. Technical Field

The present invention relates generally to the field of power distribution. More particularly, the present invention relates to a method and system for eliminating certain harmonics in a distributed power system.

2. Background Information

Distributed power systems are employed in a large number of power generation applications. In particular, the use of small and medium-size distributed power systems in a variety of applications has risen in recent years.

Conventional distributed power systems comprise either an alternating current (AC) power source or direct current (DC) power source, or a combined AC and DC power source. Such systems provide power to an end load, e.g., an end user, through an output inverter. End loads comprise either linear loads, or non-linear loads, and/or a combination of both linear and nonlinear loads. The use of nonlinear end loads in such systems has increased over the past several years. For example, the use of adjustable speed drives and uninterruptible power supplies (UPS) has increased a great deal over the past several years. Such nonlinear end loads conventionally comprise a rectifier front end which converts AC power to DC power.

The operation of nonlinear end loads often involves the injection of harmonic current into the power system. The presence of such harmonics in the power system reduces the power quality level. Many organizations that set related standards, such as the Institute of Electrical and Electronics Engineers (IEEE) and the International Electrotechnical Commission (IEC), publish standards that restrict harmonics content to a defined level. According to IEEE standard, distributed power systems must be designed to deliver "clean power" to a linear load with very low Total Harmonics Distortion (THD), e.g., less than five percent (5%). In particular, each individual harmonics component should be less than three percent (3%). Conventional distributed power systems are designed to deliver power to a linear end user load with very low THD that is in compliance with the IEEE standard.

Referring to FIG. 1, a block diagram of a conventional distributed power system is illustrated. The conventional distributed power system 10 includes an inverter 12 for receiving DC supply current 14 from a power source 16 and producing output current 18 for driving linear or non-linear load 20. Power source 16 may include AC power generator 22 and/or DC power source 24. For example, alternating current 26 from AC power generator 22 is rectified into direct current 28 by rectifier 20, and DC bus 32 delivers the direct current to inverter 12 as supply current 14. Additionally or alternately, direct current 34 from DC power source 24 is converted by DC/DC converter 36 from one voltage level 34 to another voltage level 38, and DC bus 32 delivers the direct current to inverter 12 as supply current 14. Inverter 12 converts the DC supply current into an AC output current 18. Output current 18 comprises both a fundamental frequency current and a harmonic frequency current. In order to reduce the fundamental frequency error current, controller 40 is operable for receiving the output current 18, comparing the output current 18 with a reference current (not shown), determining the fundamental frequency error current, and providing an adjustment current thereby adjusting the output current 18 accordingly.

Typically, however, when such a conventional distributed power system is connected to a nonlinear end load (e.g., a nonlinear end load at a customer's site), the THD in the power system is unacceptably high, sometimes failing the harmonic standards set forth by standards-providing organizations. The high THD in the power system is, in large part, the result of harmonics components injected into the power system by the nonlinear end load.

The harmonics injected into the distributed power system creates a problem for the supplier of the distributed power system. The magnitude of the THD injected by the nonlinear end load of various customers can vary greatly. The unpredictable harmonics injected by a customer's load makes it difficult for the supplier to provide "clean power" to end loads. Conventional systems do not provide an effective, simple, and practical solution to such a problem. What is needed is an effective, simple, and practical solution for the supplier of distributed power systems to reduce or eliminate harmonic distortion injected by nonlinear loads to distributed power systems.

SUMMARY OF THE INVENTION

It is a feature of embodiments of the present invention to provide an effective, simple, and practical solution for the supplier of distributed power systems to reduce or eliminate the effect of harmonics injected by nonlinear loads on distributed power systems. It is a further feature of embodiments of the present invention to provide a method and system for improving power quality levels in distributed power systems.

It is a further feature of embodiments of the present invention to provide a method and system that reduces or eliminates unwanted harmonics by adding an additional negative feedback control loop in the distributed power system. It is a further feature of embodiments of the present invention to provide a method and system for reducing or eliminating such harmonics that may be used with existing distributed power systems.

In one embodiment, a distributed power system comprises an inverter having a reference current, an output current and a summation component. The reference current comprises a reference fundamental frequency current and at least one reference harmonic current. The output current comprises an actual fundamental frequency current and at least one actual harmonic current. The summation component is operable to combine a first signal representative of the output of the fundamental current regulator and a second signal representative of the output of the harmonic current regulator to generate a third signal for driving the inverter to produce the output current. This DPS further comprises a control system in communication with the inverter, the control system operable for receiving a feedback signal representative of the output current and generating the harmonic error current representative of a difference between the reference harmonic current and the actual harmonic current.

In another embodiment, a distributed power system comprises an inverter having a reference current, an output current and a summation component. The reference current comprises a reference fundamental frequency current and at least one reference harmonic current. The output current comprises an actual fundamental frequency current and at least one actual harmonic current. The summation component is operable to combine a first signal, representative of the output of the fundamental current regulator, and a second signal, representative of the output of a harmonic current regulator, to generate a third signal for driving the inverter to produce the output current. The DPS further comprises a control system in communication with the inverter. The control system has a fundamental frequency current controller and a harmonics current controller. The fundamental frequency current controller may be operable for receiving a feedback signal representative of the output current and generating the fundamental frequency error current. The harmonics current controller may be operable for receiving the feedback signal and generating the harmonic error current. The fundamental frequency error current is representative of a difference between the reference fundamental frequency current and the actual fundamental frequency current. The harmonic error current is representative of a difference between the reference harmonic current and the actual harmonic current. The DPS further comprises a filtering component within the harmonics controller for removing predetermined harmonics components from the feedback signal and a transformer system for orienting the feedback signal into the same reference frame as the reference current.

In yet another embodiment, a method is provided for eliminating or substantially reducing certain harmonics in a distributed power system. The method comprises the steps of receiving an output current from a inverter; filtering predetermined harmonics components from the output current to obtain harmonics feedback current; comparing the harmonics feedback current with a reference harmonics current to obtain a harmonics error current; and adding the output of the harmonics current controller to the fundamental current controller output.

In a further embodiment, a method of eliminating or substantially reducing certain harmonics in a distributed power system is provided. The method comprises receiving harmonic current from an output of a power inverter, wherein the power inverter is connected to a nonlinear end load; transforming the output current from stationary frame to synchronous frame at predetermined harmonic frequency; generating a harmonic current regulating signal by summing the negative of the output harmonic current and an associated reference harmonic component; transforming the harmonic current regulating signal from synchronous reference frame back to stationary reference frame of the power inverter; and summing the harmonic current regulating signal and the fundamental current regulating signal in the power inverter.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale, e.g., some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
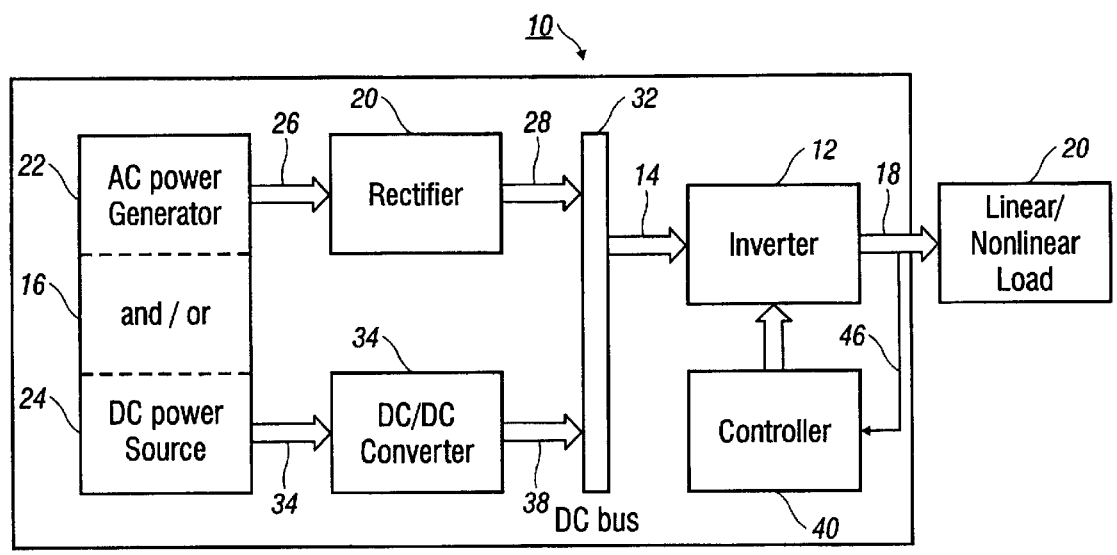
FIG. 1 is a block diagram of a conventional distributed power system.
Figure 2:
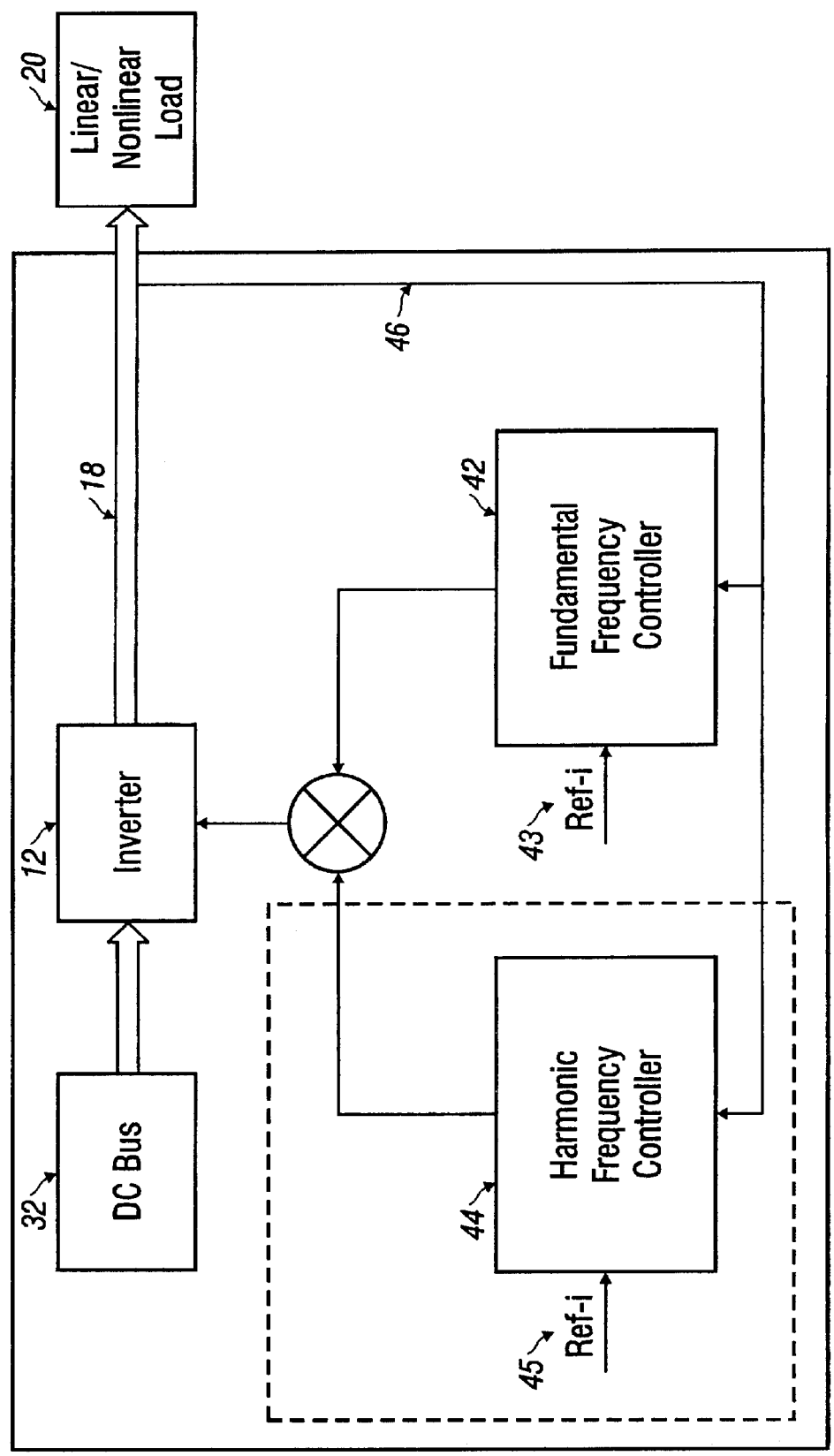
FIG. 2 is a block diagram of a distributed power system having an inverter, a fundamental frequency controller and a harmonic frequency controller in accordance with an embodiment of the present invention.

Referring to FIG. 2, a block diagram of a distributed power system having an inverter, a fundamental frequency controller and a harmonic frequency controller in accordance with an embodiment of the present invention is illustrated. As illustrated, fundamental frequency controller 42 and harmonic frequency controller 44 replace controller 40 of FIG. 1. Fundamental frequency controller 42 includes a feedback loop for controlling errors between fundamental reference current 43 and output current 18 at the fundamental frequency. Harmonic frequency controller 44 includes a feedback loop for controlling errors between harmonic reference current 45 and output current 18 at one or more harmonic frequencies.

Figure 3:
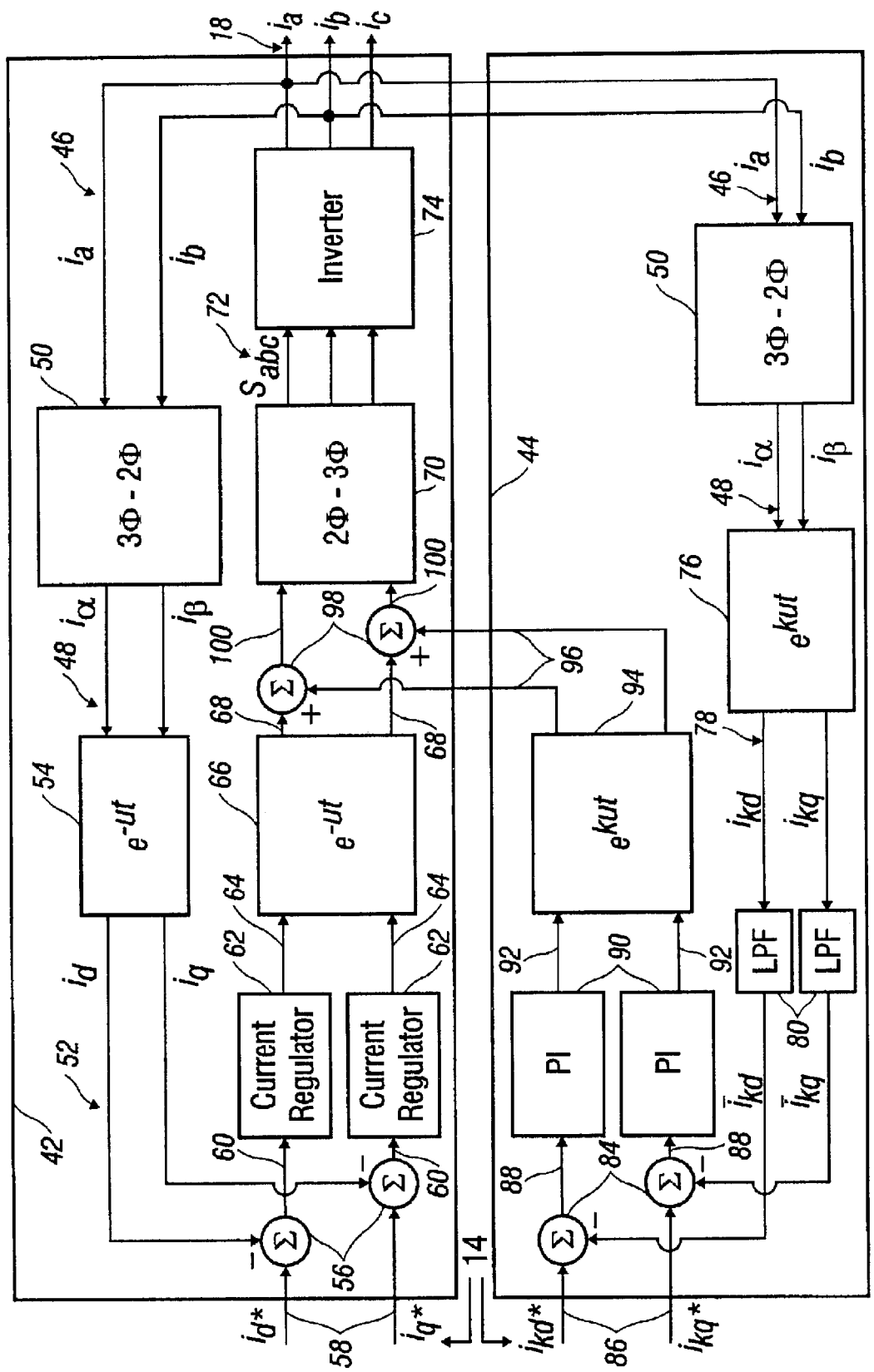
FIG. 3 is a block diagram of a fundamental frequency controller and a harmonic frequency controller in accordance with an embodiment of the present invention.

Referring to FIGS. 2 and 3, block diagrams of the fundamental frequency controller and the harmonic frequency controller in accordance with an embodiment of the present invention is illustrated. Preferably, the output voltage of inverter 12 in FIGS. 1 and 2 is controlled to be constant. As such, the output power is a function of a three-phase ($i_a$, $i_b$, and $i_c$) output current 18. In order to control output current 18 so that it follows the specific two-phase ($i_d^*$ and $i_q^*$) fundamental reference current 43, the output current 18 is measured to determine a two-phase ($i_a$ and $i_b$) output current 46, which includes a fundamental frequency current component and at least one harmonic current component. Within fundamental frequency controller 42, two-phase output current 46 is first transformed into stationary reference frame current ($i_\alpha$ and $i_\beta$) 48 by three-phase to two-phase transformer 50. Then, stationary reference frame current ($i_\alpha$ and $i_\beta$) 48 is transformed into synchronous reference frame current ($i_d$ and $i_q$) 52 or fundamental frequency feedback current 52, corresponding to the fundamental frequency component of reference current 14, by frame rotation transformer 54. Fundamental frequency feedback current ($i_d$ and $i_q$) 52 represents the feedback of the actual fundamental frequency output current that is compared by summation component 56 with reference fundamental frequency current ($i_d^*$ and $i_q^*$) 58. Summation component 56 determines fundamental frequency error current 60 that is fed into current regulator 62. Current regulator 62 regulates the error signals such that the feedback current equals the reference fundamental frequency current ($i_d^*$ and $i_q^*$) 58. The outputs 64 of the current regulator 62, which are voltage signals, are first transformed back to stationary reference frame voltage signals 68 by frame rotation transformer 66, and then transformed by two-phase to three-phase transformer 70 to abc frame voltage signals ($S_{abc}$) 72. The output voltage signals 72 control output current 18 by controlling the switching actions in inverter 74 to reduce the errors between reference fundamental frequency current ($i_d^*$ and $i_q^*$) 58 and output current 18.

Figure 4:
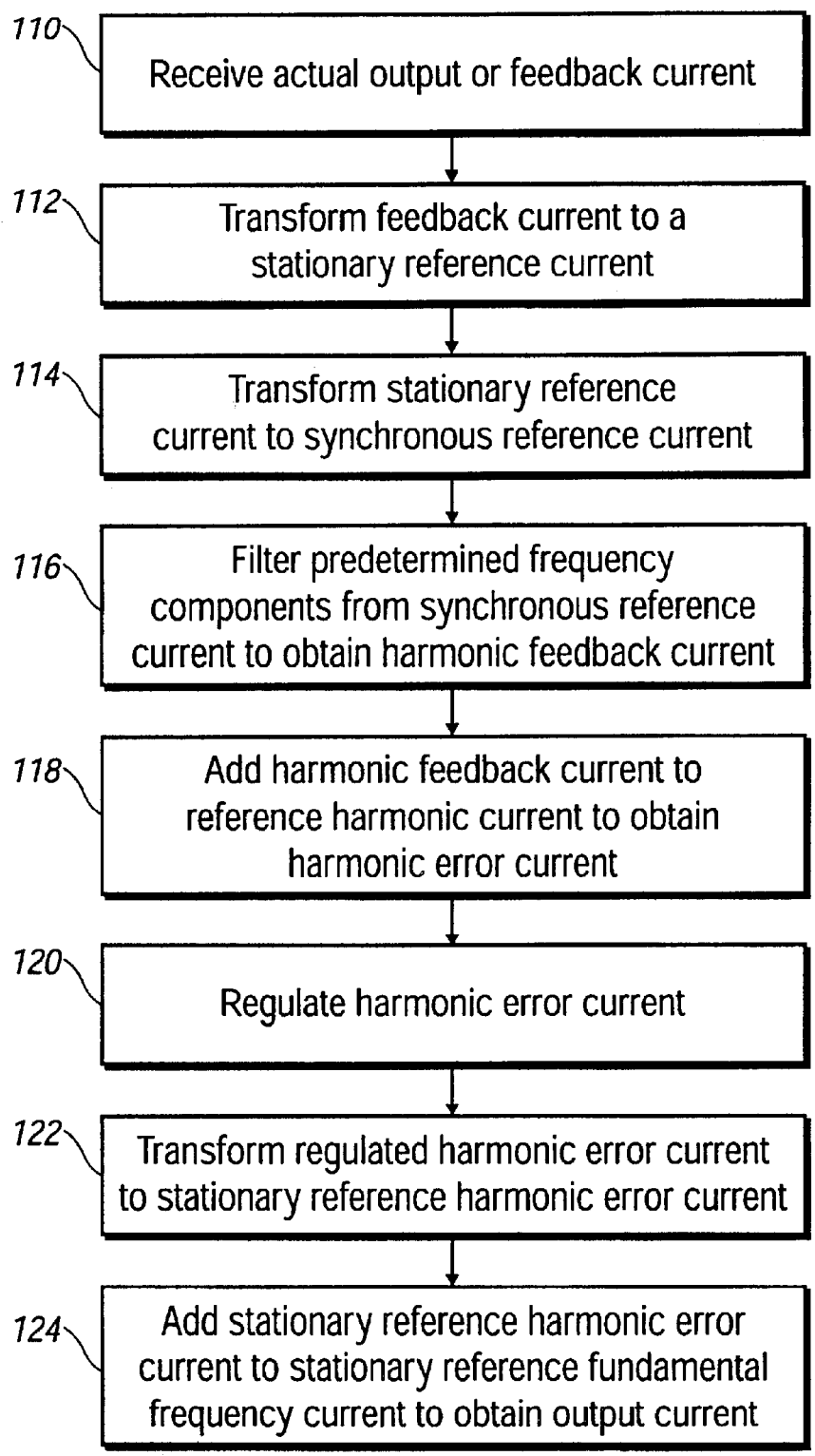
FIG. 4 is a flowchart of a method for controlling certain harmonics in a power distribution system in accordance with an embodiment of the present invention.

Referring to FIGS. 3 and 4, the method for controlling certain harmonics in a power distribution system in accordance with an embodiment of the present invention is illustrated. To control the harmonic error in the system, harmonic frequency controller 44 receives output current 18 and, in particular, two-phase output current ($i_a$ and $i_b$) 46, from inverter 74. Three-phase to two-phase transformer 50 transforms the two-phase output current ($i_a$ and $i_b$) 46 to stationary reference current ($i_\alpha$ and $i_\beta$) 48 in a stationary reference frame at steps 110 and 112, respectively. Harmonic frequency transformer 76 transforms stationary reference current ($i_\alpha$ and $i_\beta$) 48 to synchronous reference current ($i_{kd}$ and $i_{kq}$) 78 in a synchronous reference frame corresponding to a predetermined kth harmonic of reference fundamental frequency current ($i_d^*$ and $i_q^*$) 58 at step 114. Filtering device 80, such as a low pass filter (LPF), filters predetermined frequency components, such as alternating current (AC) components, from synchronous reference current ($i_{kd}$ and $i_{kq}$) 78 to obtain harmonic feedback current ($i_{kd}$ and $i_{kq}$) 82 at step 116. For example, predetermined frequency components include all AC components in the output 78 of the synchronous frame transformer 76. Summation component 84 compares harmonic feedback current ($i_{kd}$ and $i_{kq}$) 82 with reference harmonic current ($i_{kd^*}$ and $i_{kq^*}$) 86 to obtain harmonic error current 88 at step 118. Regulator 90, such as a proportional and integral regulator, operates on harmonic error current 88 to provide regulating signals 92 at step 120. Then, harmonic frequency transformer 94 transforms regulating signals 92 to stationary reference voltage 96 in stationary reference frame at step 122. Summation component 98 adds the outputs of both fundamental current regulators 68 and harmonic current regulators 96 in stationary frame to form a combined regulating voltage signal 100 at step 124. Transformer 70 converts the combined regulating voltage signal 100 from two-phase voltage signals to three-phase voltage signals, thereby generating abc frame voltage signals 72 that are used to control the inverter 74 to form output current 18 at step 124. Thus, fundamental frequency controller 42 in combination with harmonic frequency controller 44 insure that the fundamental frequency component of the output current 18 follows the fundamental reference current 43 and one or more harmonic components of the output current 18 follow one or more harmonic reference current 45.

Following the IEEE standard, a total harmonic distortion (THD) of less than five percent (5%) and each harmonic component of less than three percent (3%) are required. Preferably, lower order harmonics, such as $5^{th}$ and $7^{th}$ harmonics, should be maintained as low as possible. The maximum allowable level of a particular harmonic component to be controlled is usually given in DC value $i_{kd}^*$ and $i_{kq}^*$.

The signals measured at the output currents are in AC value and contain all harmonic components that the inverter may generate. The following further describes the AC-DC transformer, filtering, and the harmonic current regulation mentioned above with respect to harmonic frequency controller 44 FIG. 2.

Frame Transformation

The three phase feedback or actual output currents measured at the inverter output are in AC value and contains harmonic components. The transformation from abc frame to stationary frame $\alpha$-$\beta$ is realized at transformer 50. Assuming there is a third frame d-q that is rotating at the $k^{th}$ harmonics frequency, the transformation from the stationary frame $\alpha$-$\beta$ to the rotating frame d-q results in the $k^{th}$ harmonics component being in DC value while all other components are still in AC value. This transformation from two axis stationary frame $\alpha$-$\beta$ to two axis rotating frame d-q (often called Synchronous Reference Frame) is realized at harmonics transformer 76.

Low Pass Filter

After the frame rotation transformation by harmonics transformer 76, only the $k^{th}$ harmonic component is transformed into DC value. The remaining components, in particular, the fundamental component (50/60 Hz) counting for more than 95% of the total feedback current, are still in AC values. To remove the AC components, filtering devices 80, such as two Low Pass Filters (LPFs), are used. In order to extract the DC components without any phase delay, a sixth-order Butterworth low pass filter is used. In alternate embodiments, other filters are utilized, depending on the predetermined harmonics to be filtered. The way of choosing poles for the Butterworth filter is to spread them out around the unit circle for normalized frequency in such a way as to peak up the dynamic response and give a maximally flat result. In one embodiment, the cutoff frequency of the filter may be about 10 Hz. In alternate embodiments, other cutoff frequencies are utilized depending on the predetermined harmonics to be filtered.

Harmonic Current Regulators and Feedback Control

The goal with harmonic current regulators and feedback control is to eliminate the $k^{th}$ harmonic component in the output current. Two proportional and integral (PI) current regulators 90 may be used with harmonic reference currents of $i_{kd}^*$ and $i_{kq}^*$. The PI current regulators are designed such that the $k^{th}$ harmonics ($i_{kd}$ and $i_{kq}$) of the output current 18 at the inverter output is always kept at or below the reference harmonic current ($i_{kd}^*$ and $i_{kq}^*$) value down to zero. Harmonic transformer 94 rotates the regulating signal 92 of current regulators 90 back to stationary frame with k times of the fundamental frequency. The transformed signals 96 in the stationary frame are added to the output of the fundamental frequency current regulator 68 to form combined regulating signals.

In other embodiments, the harmonic frequency controller 44 can include more than one harmonic current control loop. For example, most nonlinear loads have a rectifier front end. The operation of the rectifier involves the injection of harmonic current into the power system. The dominant portion of the injected harmonics is usually at low frequencies, such as the $5^{th}$ and/or the $7^{th}$ harmonics. If the current feedback signals show more than one dominant harmonic component, such as $5^{th}$ and $7^{th}$ harmonics, and the need to eliminate both harmonics are justified, a second harmonic canceller loop may be added to the system. For example, in the above discussion let k=5 for simplicity. Assuming the second harmonic current control loop, for example, the $7^{th}$ harmonic control loop associated with k=7, is similar to the $5^{th}$ harmonic control loop with the same current feedback as described above, the outputs of the $7^{th}$ harmonic current regulator are also added to the output of the fundamental frequency current regulator 68 at the same points as $5^{th}$ harmonic current regulators" output. The only difference then between $5^{th}$ and $7^{th}$ harmonic controllers is the rotation from stationary reference frame to synchronous reference frame at different frequencies, in this case, at 7 times of the fundamental frequency. Hence, more than two harmonic current control loops can be used in this type of control structure to eliminate extra harmonic components.

Thus, the present invention provides systems and methods for eliminating certain or dominant harmonics in a distributed power system. The systems and methods include receiving harmonic current from an output of a power inverter, where the power inverter may be connected to a nonlinear end load. The harmonic current from the inverter output is transformed to the synchronous reference frame in a DC form. The reference harmonic current, also in DC form, is compared with the feedback harmonic current. The difference is used as the input of the harmonic current regulator. The regulating signal at the output of the harmonic current regulator is transformed to the stationary reference frame and is added to the output of the fundamental current regulator in stationary reference frame to control the power inverter to produce the output current. Hence, the harmonic current controller takes the feedback signals from the output of an inverter, compares the feedback signals with a reference signal and generates a regulating signal to eliminate or substantially reduce the corresponding harmonics injected by the user load.

Various embodiments of the invention have been described above. It should be recognized, however, that these embodiments are merely illustrative of the principles of the present invention. Numerous modifications and adaptations thereof will be apparent to those skilled in the art without departing from the spirit and scope of the present invention.

What is claimed is:

1. A distributed power system, comprising:
    an inverter configured to receive a supply current and to convert the supply current to an output current having at least a fundamental frequency current; and
    at least one harmonic feedback system configured to receive the output current and a reference harmonic current of the fundamental frequency current, to compare the output current with the reference harmonic current and to generate a harmonic error current for driving the inverter to produce the output current, wherein the harmonic error current is representative of a difference between the reference harmonic current and the output current, wherein said at least one harmonic feedback system further includes at least:
        a harmonic frequency transformer whose target synchronous reference frame frequency is based upon the reference harmonic current of the fundamental frequency current.

2. The system of claim 1, wherein the harmonic error current maintains the output current within a predetermined total harmonic distortion limit.

3. The system of claim 2, wherein the predetermined total harmonic distortion limit further comprises a predetermined level limit of individual harmonic component.

4. The system of claim 3, wherein the predetermined total harmonic distortion limit is less than 5%.

5. The system of claim 3, wherein the predetermined level limit of individual harmonic component is less than 3%.

6. The system of claim 1, wherein the at least one harmonic feedback system further comprises a three-phase to two-phase transformer configured to convert the output current from a three-phase current to a two-phase stationary reference current.

7. The system of claim 1, wherein the harmonic frequency transformer further comprises the harmonic frequency transformer configured to convert the two-phase stationary reference current to a synchronous reference current.

8. The system of claim 1, wherein the at least one harmonic feedback system further comprises at least one filter device configured to remove predetermined components from the synchronous reference current to output a harmonic feedback current.

9. The system of claim 8 further comprising a summation component to compare the harmonic feedback current with the reference harmonic current and to output a harmonic error current for driving the inverter to produce the output current.

10. The system of claim 8, wherein the predetermined components comprise AC frequencies.

11. The system of claim 8, wherein the at least one filter device comprises a low pass filter having a cutoff frequency of 10 Hz.

12. The system of claim 8 further comprises at least one regulator configured to regulate the harmonic feedback current and to output a regulated signal.

13. The system of claim 12 further comprises at least one summation component configured to combine the regulated signal with a fundamental signal and to output a combined regulating voltage signal.

14. The system of claim 13 further comprises a transformer configured to transform the combined regulating voltage signal from a two-phase voltage signal to a three-phase voltage signal which is used to control the inverter to form the output current.

15. The system of claim 13 wherein the fundamental signal is a fundamental error current generated by a fundamental frequency feedback system configured to receive the output current from the inverter and a reference fundamental current, to compare the output current with the reference fundamental current and to generate the fundamental error current for driving the inverter to produce the output current, wherein the fundamental frequency error current is representative of a difference between the reference fundamental frequency current and the output fundamental frequency current.

16. A harmonic feedback system comprising:
    a three-phase to two-phase transformer configured to convert an output fundamental frequency current from a distributed power system and to convert the output fundamental frequency current from a three-phase current to a two-phase stationary reference current;
    a harmonic frequency transformer configured to convert the two-phase stationary reference current to a synchronous reference current, said harmonic frequency transformer having a target synchronous reference frame frequency based upon a reference harmonic current of the output fundamental frequency current;
    at least one filter device configured to remove predetermined components from the synchronous reference current to output a harmonic feedback current; and
    a summation component to compare the harmonic feedback current with the reference harmonic current and to output a harmonic error current for driving the distributed power system to produce the output current.

17. A method of eliminating certain harmonics in a distributed power system, wherein the power system comprises a fundamental current regulating signal, comprising:
    receiving an output fundamental frequency current from a inverter;
    transforming the output fundamental frequency current from a stationary reference frame to a synchronous reference frame, where the synchronous reference frame frequency is based upon a reference harmonic current of the output fundamental frequency current;
    filtering predetermined frequency components from a transformed version of the output current to obtain harmonics feedback current;
    comparing the harmonics feedback current with a reference harmonics current to obtain a harmonics error current;
    regulating the harmonics error current to generate a harmonic current regulating signal; and
    adding the harmonic current regulating signal to a fundamental current regulating signal to form a combined regulating signal.

18. The method of claim 17, further comprising:
    transforming the output current from an abc frame to the stationary reference frame; and wherein the harmonic current regulating signal is transformed back to a stationary reference frame prior to adding the harmonics current regulating signal to the fundamental current regulating signal.

19. The method of claim 18, where filtering predetermined frequency components further comprises filtering alternating current components.

20. A method of eliminating certain harmonics in a distributed power system, comprising:

receiving a fundamental frequency current from an output of a power inverter, wherein the power inverter is connected to a nonlinear end load;

creating a harmonic feedback current by transforming the fundamental frequency current to a target synchronous reference frame, where the target synchronous reference frame frequency is based on a harmonic current of the fundamental frequency current;

providing a harmonic error current by summing the negative of the harmonic feedback current and an associated reference harmonic current;

regulating the harmonic error current to generate a harmonic current regulating signal;

transforming the harmonic current regulating signal to a reference frame of a fundamental current regulating signal in the power inverter; and summing the harmonic current regulating signal and the fundamental current regulating signal in the power inverter.

* * * * *